United States Patent [19]

Fong

[11] Patent Number: 4,657,679

[45] Date of Patent: Apr. 14, 1987

[54] AMPIQ COPOLYMERS AS SCALE INHIBITORS

[75] Inventor: Dodd W. Fong, Naperville, Ill.

[73] Assignee: Nalco Chemical Company, Oak Brook, Ill.

[21] Appl. No.: 839,236

[22] Filed: Mar. 13, 1986

[51] Int. Cl.$^4$ ............................................. C02F 5/12
[52] U.S. Cl. ....................................... 210/701; 252/180
[58] Field of Search ................................ 210/698–701; 252/180, 181

[56] References Cited

U.S. PATENT DOCUMENTS

| | | | |
|---|---|---|---|
| 3,752,760 | 8/1973 | Gordon, Jr. et al. | 210/701 |
| 3,752,761 | 8/1973 | Boothe et al. | 210/701 |
| 4,164,521 | 8/1979 | Goodman | 252/180 |
| 4,271,058 | 6/1981 | Trabitzsch et al. | 210/701 |
| 4,357,207 | 11/1982 | Yorke | 210/698 |
| 4,460,477 | 7/1984 | Costello et al. | 210/701 |
| 4,515,658 | 7/1985 | Fong | 162/168.4 |
| 4,568,721 | 2/1986 | Fong et al. | 162/175 |

FOREIGN PATENT DOCUMENTS 82306648.5 12/1982 European Pat. Off. .
2026517 7/1978 United Kingdom .

OTHER PUBLICATIONS

A copy of a computer search completed 8/2/83, listing various references to monomers related to AMPIQ Monomer.

*Primary Examiner*—Peter Hruskoci
*Attorney, Agent, or Firm*—John G. Premo; Donald G. Epple

[57] ABSTRACT

A method is disclosed to control calcium phosphate scale by using an effective amount of an ampholytic polymer synthesized from acrylic acid, methacrylic acid, and the quaternary salts of 1-acryloyl-4-methyl piperizine, or mixtures thereof.

8 Claims, No Drawings

AMPIQ COPOLYMERS AS SCALE INHIBITORS

INTRODUCTION

Scale deposits are incrustation coatings which may be found on any surface exposed to industrial waters. If these industrial waters contain hardness ions, particularly calcium, magnesium, and the like, and in addition contain orthophosphate ions or materials which may hydrolyze or react with water to form orthophosphate ions, then the scale deposit which can be formed is calcium phosphate, which causes deposit buildup problems in industrial systems using industrial waters, such systems being cooling towers, boilers, precipitators, flocculators, filters, and the like.

The industrial waters may also contain, and ordinarily will contain, a number of other dissolved salts, the amount and nature of which will depend upon the source of the water, the treatments the water receives prior to its use, and the number of times the water may circulate, and hence concentrate, in an industrial system. Thus, the water usually contains cations of alkaline earth metals, primarily calcium and magnesium, and such anions as hydroxide, bicarbonate, carbonate, sulfate, silicate, phosphate, halides such as fluoride, chloride, bromide, and iodide, and may additionally contain organic anions such as acetate, oxalate, and the like. Therefore, other difficult scales such as $Mg(OH)_2$, $CaCO_3$, magnesium silicate, and the like, may also form on surfaces exposed to these waters.

Various factors may be involved in causing scaling on surfaces exposed to these industrial waters. Such factors include temperature, pH, concentrations through evaporation, amount of dissolved solids and heat transferred, since many of the surfaces on which scales are forming are heat transfer surfaces.

For boiler systems and cooling systems and similar heat exchange systems, the mechanism of scale formation appears to be a crystallization of various scale forming salts from solutions in the industrial waters which allow for scale formation immediately adjacent to or onto the heat exchange surface of the industrial system. When the solubility of scale forming products is exceeded, a thin film of amorphous and/or crystallized scale results on the heat exchange surface.

Although other mechanisms are also available to explain the existance of these scales, they are not as important to the existing invention. What is important, is that, in the presence of calcium ions and orthophosphate ions and under appropriate conditions, a calcium phosphate scale is formed on surfaces exposed to industrial waters containing both calcium and phosphate ions. This calcium phosphate scale formation should be prohibited.

It is an object of this invention to inhibit the formation of these calcium phosphate scales, and perhaps other scales commonly found in industrial waters, by treating these industrial waters with an effective amount of ampholytic polymers having a particular type of cationic monomer.

It is also an object of this invention to describe methods of use and composition for ampholytic polymers containing the quaternized salt of 1-acryloyl-4-methyl-piperazine (hereinafter AMPIQ).

Further objects of this invention will become apparent.

DESCRIPTION OF THE INVENTION

My invention is a method of inhibiting the formation of calcium phosphate scales on surfaces exposed to industrial waters which comprises treating said industrial waters with an effective amount of an ampholytic polymer consisting essentially of randomly distributed monomer units of:

a. an acidic monomer having the structure:

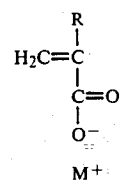

wherein R is chosen from H, $-CH_3$, and $-C_2H_5$, and mixtures thereof; and M is chosen from hydrogen, ammonium, alkali metals, and ½ alkaline earth metals, and mixtures thereof; and b. a cationic monomer having the structure:

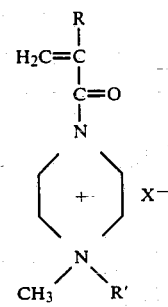

wherein R is chosen from H, $-CH_3$, $-C_2H_5$, and mixtures thereof; R' is chosen from lower alkyl, linear or branched, groups having from 1 to 4 carbon atoms; and X is chosen from Cl, Br, I, OH, $CH_3SO_4$, $NO_3$, and sulfite, bisulfite, sulfate, bisulfate, and mixtures thereof; and wherein the ampholytic polymer contains the acid monomer and cationic monomer at mole ratios ranging from 100:1 to 1:100, and has a molecular weight ranging between about 1,000–75,000.

Preferably, our method is used advantageously when the ampholytic polymer consists of a random combination of the following monomers:

a. Acrylic acid, or its water-soluble salts, such as the sodium, potassium, ammonium, tetramethyl ammonium, or other alkali or alkaline earth metal salts, or mixtures thereof;

b. Methacrylic acid, or its water-soluble salts, as above; and, c. A cationic monomer represented by:

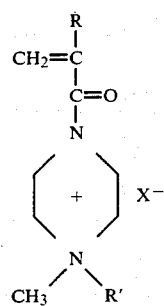

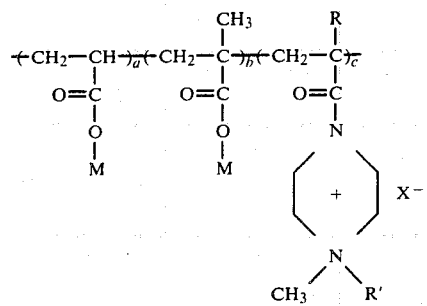

wherein R is hydrogen, methyl, ethyl, and mixtures thereof;

R' is methyl, ethyl, and mixtures thereof; and

X is chloride, bromide, iodide, hydroxide, methyl sulfate, and mixtures thereof; and wherein the mole ratio of a:b:c ranges between 10:10:80 to about 70:25:5, and the molecular weight is between about 1,500–50,000.

The ampholytic polymer above is preferably a copolymer or terpolymer of the acidic monomers with the cationic monomers as described. It is most preferable that the acidic monomer be either acrylic acid, methacrylic acid, their water-soluble salts, as above, or combinations thereof. The terms acrylic acid or methacrylic acid, when used hereinafter, shall mean the free acids or any of the water-soluble salts thereof. The cationic monomer is a quaternized salt of AMPIQ wherein the quaternizing agent is an alkyl halide or an alkyl methyl sulfate, or combination thereof, so as to obtain a substituted piperizinium quaternary salt having the above structures.

The quaternary cationic ion has combined with it an equivalent amount of a geganion preferably chosen from chloride, bromide, iodide, and methyl sulfate ion, or mixtures thereof. However, the geganion may also be any ion, present in equivalent quantities, such as, but not limited to, flouride, chloride, bromide, iodide, hydroxide, methyl sulfate, sulfate, bisulfate, carbonate, phosphate, nitrate, and the like, or mixtures thereof.

It is most preferred that the ampholytic polymer consists of randomly distributed monomer units of acrylic acid, methacrylic acid, and mixtures thereof, with the methyl quaternized salt of 1-acryloyl-4-methyl piperizine (AMPIQ). The methyl quaternized salt is most easily obtained by quaternizing the AMPIQ starting amine compound, above mentioned, with any flourine-free methyl halide or with dimethyl sulfate.

It is most preferred to treat industrial waters with at least 2 ppm of the ampholytic polymers of this invention, preferably 5 ppm, and most preferably from about 10–25 ppm of the ampholytic polymers, which ampholytic polymers are represented by a composition as follows:

wherein M is chosen from hydrogen, lithium, sodium, potassium, ammonium, and mixtures thereof;

R is chosen from the group hydrogen, methyl, ethyl, and mixtures thereof;

R' is chosen from the group consisting of methyl, ethyl, propyl, and butyl groups; isomers thereof; and mixtures thereof; and X is an anionic geganion, present in equivalent amounts, and chosen from the group consisting of flouride, chloride, bromide, iodide, hydroxide, methylsulfate, sulfate, bisulfate, sulfite, bisulfite, carbonate, bicarbonate, phosphate, nitrate, and mixtures thereof; and wherein the ampholytic polymer has a molecular weight ranging between about 1,000–75,000; and also wherein a and b, each, independently, may be zero, provided that the mole ratio of monomers represented by the sum, a+b, to the monomers represented by c must range between about 50:1 to about 1:10.

Preferably the ampholytic polymers to be used in my invention are represented by:

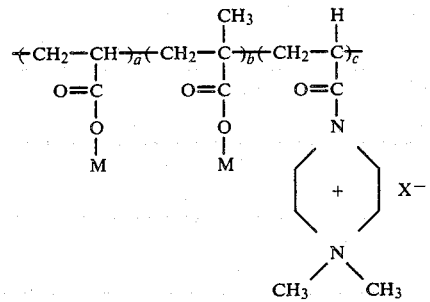

wherein X is chosen from chloride, bromide, hydroxide, methylsulfate, and mixtures thereof; and wherein either a or b may be zero, but may not both be zero, and the mole ratio of monomers represented by the sum, a+b, to monomers represented by c ranges between about 10:1 to about 1:1, and wherein the sum, a+b+c, is sufficient to achieve a molecular weight ranging between about 2,000–30,000.

Most preferably, the industrial waters are treated with at least 5 ppm of the ampholytic polymer, b is zero, and the molecular weight ranges between about 2,000–30,000, and the mole ratio of monomers represented by a and c is between about 10:1 to 1:1.

In addition, the industrial waters can be treated with at least 5 ppm of the ampholytic polymer above where a is zero, and the molecular weight ranges between about 2,000–30,000 and the mole ratio of b to c monomers is between about 10:1 to 1:1.

In the methods above, the ampholytic polymers used may be used as co-polymers or as terpolymers, or may contain more than three monomeric repeating units. However, acrylic acid and/or methacrylic acid and the cationic monomers described above must always be present. The cationic monomers of the 1-acryol-4,4-dimethyl piperizinium salts, which are collectively referred to as AMPIQ, are the preferred cationic monomers.

The molecular weights of my ampholytic polymers are between about 1,000–75,000, and are preferably between about 1,500–50,000, and are most preferably between about 2,000–30,000.

In the terpolymer, the mole ratio of acrylic acid:methacrylic acid and AMPIQ normally ranges between about 50:50:1 to about 0.5:0.5:100. The polymers are best described, however, where a or b represents monomers in the formula above which may each be, independently, 0, provided that the mole ratio of monomers represented by the sum of a+b to monomers represented by c must range between 50:1 to about 1:10, preferably between about 10:1 to 1:10.

However, although preferred results can be obtained with terpolymers, certain ampholytic co-polymers also obtain good results. Therefore, polymers in which b is zero and have a molecular weight range between 2,000–30,000 and wherein the mole ratio of monomers represented by a and c ranges between 10:1 to 1:1 may be used in my invention.

Similarly, ampholytic co-polymers represented by the formulation above wherein a is zero, and in which the molecular weight ranges between 2,000–30,000 and the mole ratio of methacrylic acid to the AMPIQ is about 10:1 to 1:1 are also preferred.

To better describe my invention and illustrate the efficacy of my invention, I provide the following examples:

EXAMPLES

Co-polymers represented by the formulas above when synthesized and tested for calcium phosphate scale inhibition. Test results were compared to identical test waters with no polymer treatment; but under identical test conditions such as time, temperature, concentration of calcium ion phosphate ion, and the like. Results are reported in Table I in terms of percent calcium phosphate inhibition, compared to a blank with no treatment, at treatment concentration of 10 and 20 ppm of ampholytic polymer.

TABLE I

| Polymer Composition | Monomer Mole Ratio | Molecular Wt.; Weight Average | % Calcium Phosphate Inhibition at Treatment of | |
|---|---|---|---|---|
| | | | 10 ppm | 20 ppm |
| Acrylic Acid:AMPIQ* | 90:10 | 24,100 | 9% | 61% |
| Acrylic Acid:AMPIQ | 70:30 | 3,150 | 8% | 42% |
| Methacrylic Acid:AMPIQ | 80:20 | 37,200 | 7% | 15% |
| Acrylic Acid:Methacrylic Acid:AMPIQ | 60:20:20 | 17,400 | 13% | 97% |
| Acrylic Acid:AMPIQ | 80:20 | 3,200 | 69% | — |
| Acrylic | 80:20 | 5,100 | 33% | 73% |

*AMPIQ = 1-acryloyl-4,4-dimethyl piperizinium chloride

The co-polymers were synthesized by standard vinylic polymerization techniques using free radical catalysts, appropriate ratios of vinyl monomers, and heated to reaction temperatures in an aqueous solvent.

An example of this procedure, which should not limit the scope of my invention, is as follows:

SYNTHESIS OF ACRYLIC ACID—METHACRYLIC ACID—AMPIQ TERPOLYMER

A solution of acrylic acid (22.08 g), methacrylic acid (8.81 g) and AMPIQ (54.1 g, 50% aqueous solution) in 255 g of water was charged into a 1-liter, 4-neck round bottom reaction flask which was equipped with a mechanical stirrer, a thermometer, and a condensor. The solution was heated to 60° C. under nitrogen atmosphere. Ammonium persulfate (1.45 g in 10 g water) and sodium bisulfite (4.34 g in 30 g water) were added in sequence. Reaction temperature went up to 75° C. and gradually cooled to and was maintained at 60° C. for four hours. The polymer was characterized by GPC and C13 NMR. The molecular weight of the polymer was 17,400, as determined using polystyrene sulfonate as a standard.

Having described my invention, I claim:

1. A method of inhibiting the formation of calcium phosphate scales on surfaces exposed to industrial waters which comprises treating said industrial waters with an effective amount of an ampholytic polymer comprising randomly distributed monomer units of:

a. an acidic monomer having the structure:

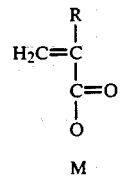

wherein R is independently chosen, at each occurrence, from H, —CH$_3$, and —C$_2$H$_5$, and mixtures thereof; and M is chosen from hydrogen, ammonium, alkali metals, and ½ alkaline earth metals, and mixtures thereof; and b. a cationic monomer having the structure:

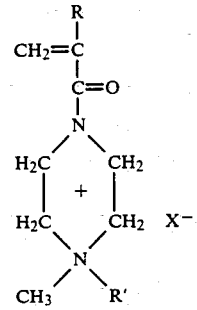

wherein

R is independently chosen, at each occurrence, from H, —CH$_3$, —C$_2$H$_5$, and mixtures thereof;

R' is is chosen from lower alkyl, linear or branched, groups having from 1 to 4 carbon atoms; and X is chosen from Cl$^-$, Br$^-$, I$^-$, OH$^-$, —CH$_3$SO$_4$$^-$, —NO$_3$$^-$, sulfite, bisulfite, sulfate, bisulfate, and mixtures thereof; and wherein the ampholytic polymer contains from 50:1 to 1:10 mole ratios of monomers a:b, and has a molecular weight ranging between about 1,000–75,000.

2. The method of claim 1 wherein the ampholytic polymer consists of a random combination of the monomers:

a. Acrylic acid, or its water-soluble salts;

b. Methacrylic acid, or its water-soluble salts; and, c. A monomer represented by:

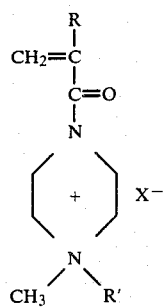

wherein R is hydrogen, methyl, ethyl, and mixtures thereof;

R' is methyl, ethyl, and mixtures thereof; and

X is chloride, bromide, iodide, hydroxide, methyl sulfate, and mixtures thereof; and wherein the mole ratio of a:b:c ranges between 10:10:80 to about 70:25:5, and the molecular weight is between about 1,500–50,000.

3. The method of claim 2 wherein the ampholytic polymer is a terpolymer of acrylic acid, or its water-soluble salts, methacrylic acid, or its water-soluble salts, and a 1-acryloyl-4,4-dimethyl piperazinium salt having an anion chosen from the group consisting of chloride, bromide, hydroxide, methylsulfate, and mixtures thereof, and wherein the mole ratio of acrylic acid:methacrylic acid:1-acryloyl-4,4-dimethyl piperizinium salt ranges between about 50:10:40 to about 70:25:5.

4. The method of claim 3 wherein the mole ratio of acrylic acid:methacrylic acid:1-acryloyl-4,4-dimethyl piperizinium salt is from 50:20:30 to 60:30:10 and the molecular weight ranges from 2,000–30,000.

5. A method of inhibiting the formation of calcium phosphate scales on surfaces in contact with industrial waters which comprises treating said waters with at least 2 ppm of an ampholytic polymer having a composition represented by:

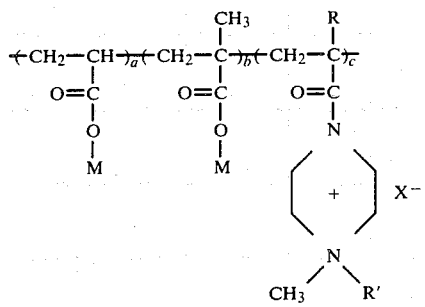

wherein M is chosen from hydrogen, lithium, sodium, potassium, ammonium, and mixtures thereof;

R is chosen from the group hydrogen, methyl, ethyl, and mixtures thereof;

R' is chosen from the group consisting of methyl, ethyl, propyl, and butyl groups; isomers thereof; and mixtures thereof; and X is an anion, present in equivalent amounts, and chosen from the group consisting of chloride, bromide, iodide, hydroxide, methylsulfate, sulfate, bisulfate, sulfite, bisulfite, carbonate, bicarbonate, nitrate, phosphate, and mixtures thereof; and, wherein the ampholytic polymer has a molecular weight ranging between about 1,000–75,000; and also, wherein a or b, may be zero provided that the mole ratio of monomers represented by the sum, a+b, to the monomers represented by c must range between about 10:1 to about 1:10.

6. The method of claim 5 wherein the ampholytic polymer is represented by:

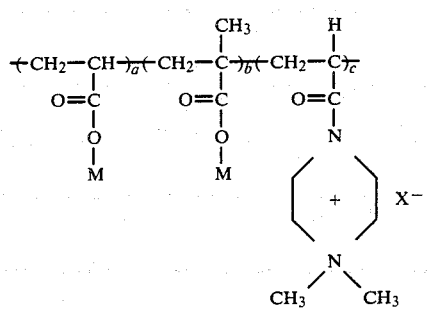

wherein X is chosen from chloride, bromide, hydroxide, methylsulfate, and mixtures thereof; and wherein the sum of a+b is from 1 to 10 and c has a value of 1, and the mole ratio of monomers represented by the sum, a+b, to monomers represented by c ranges between about 10:1 to about 1:1, and wherein the sum of a+b+c is sufficient to achieve a molecular weight ranging between about 2,000–30,000.

7. The method of claim 5 wherein the industrial waters are treated with at least 5 ppm of the ampholytic polymer, wherein b is zero, and the molecular weight ranges between about 2,000–30,000, and the mole ratio of a to c monomers is between about 10:1 to 1:1.

8. The method of claim 5 wherein the industrial waters are treated with at least 5 ppm of the ampholytic polymer, wherein a is zero, and the molecular weight ranges between about 2,000–30,000, and the mole ratio of b to c monomers is between about 10:1 to 1:1.

* * * * *